United States Patent
Hyppönen et al.

(10) Patent No.: US 6,577,920 B1
(45) Date of Patent: Jun. 10, 2003

(54) COMPUTER VIRUS SCREENING

(75) Inventors: Mikko Hyppönen, Espoo (FI); Ari Hyppönen, Espoo (FI); Mikko Kuisha, Helsinki (FI); Urmas Rahu, Espoo (FI); Risto Siilasmaa, Espoo (FI)

(73) Assignee: Data Fellows Oyj, Espoo (FI)

( * ) Notice: Subject to any disclaimer, the term of this patent is extended or adjusted under 35 U.S.C. 154(b) by 0 days.

(21) Appl. No.: 09/165,279

(22) Filed: Oct. 2, 1998

(51) Int. Cl.$^7$ ............................................... H04L 9/00
(52) U.S. Cl. ....................... 700/200; 713/176; 713/201
(58) Field of Search .................... 713/201, 164, 713/188, 200, 176

(56) References Cited

U.S. PATENT DOCUMENTS

| | | | | |
|---|---|---|---|---|
| 5,311,591 A | * | 5/1994 | Fischer | 380/4 |
| 5,475,839 A | * | 12/1995 | Watson et al. | 395/650 |
| 5,951,698 A | * | 9/1999 | Chen et al. | 714/38 |
| 5,956,481 A | * | 9/1999 | Walsh et al. | 395/186 |
| 5,960,170 A | * | 9/1999 | Chen et al. | 395/183 |
| 5,974,141 A | * | 10/1999 | Saito | 380/4 |
| 5,978,917 A | * | 11/1999 | Chi | 713/201 |
| 6,006,329 A | * | 12/1999 | Chi | 713/200 |
| 6,094,731 A | * | 7/2000 | Waldin et al. | 714/38 |
| 6,108,799 A | * | 8/2000 | Boulay et al. | 713/200 |

OTHER PUBLICATIONS

Microsoft Press; Microsoft Corporation, Microsoft Press Computer Dictionary. 1997, 3rd Edition, pp. 129,294,302, 327, and 430.*
Microsoft Press: Computer Dictionary: 1997 Microsoft Press, Redmond, Washington. 3rd Edition, p. 294.*
Adam, John A.; Data Security: Cyptography=Privacy?, IEEE Spectrum. Aug. 1992, New York, start p. 29.*
Schneier, Bruce; John Wiley ? Sons, Inc., Applied Cryptography, $2^{nd}$ Edition. 1996, Canada, pp. 34–41.*
Okamoto, E.; ID–based authentication system for computer virus detection, Electronics Letters. Jul. 1990, Kawasaki, Japan, pp. 1169–1170.*
Omura, J.K.; Novel applications of cryptography in digital communications, IEEE Communications Magazine, May 1990, Los Angeles, CA, pp. 21–29.*
Macro Mania, Northstar Solutions.com. Copyright 1996–2002, 2 pages.*
Commercial Add–ons, Surpac.com, 2 pages.*
Klaming, Guenther; Download Turbo Font, Turbofnt.com. 1999, 2 pages.*
Anonymous; Combat Macro Viruses with Digital Signatures, ZD Journals. Jan. 2000, Louisville, vol. 7, pp. 4–8.*

* cited by examiner

*Primary Examiner*—Gail Hayes
*Assistant Examiner*—Leynna Ha
(74) *Attorney, Agent, or Firm*—Browdy and Neimark, P.L.L.C.

(57) ABSTRACT

A method of screening a software file for viral infection comprising defining a first database of known macro virus signatures, a second database of known and certified commercial macro signatures, and a third database of known and certified local macro signatures. The file is scanned to determine whether or not the file contains a macro. If the file contains a macro, a signature for the macro is determined and screened against the signatures contained in said databases. A user is alerted in the event that the macro has a signature corresponding to a signature contained in said first database and/or in the event that the macro has a signature which does not correspond to a signature contained in either of the second and third databases.

14 Claims, 2 Drawing Sheets

COMPUTER VIRUS SCREENING

FIELD OF THE INVENTION

The present invention relates to the screening of computer data for viruses and more particularly to the screening of computer data for macro viruses.

BACKGROUND OF THE INVENTION

Computer data viruses represent a potentially serious liability to all computer users and especially to those who regularly transfer data between computers. Computer viruses were first identified in the 1980's, and up until the mid-1990s consisted of a piece of executable code which attached itself to a bona fide computer program. At that time, a virus typically inserted a JUMP instruction into the start of the program which, when the program was executed, caused a jump to occur to the "active" part of the virus. In many cases, the viruses were inert and activation of a virus merely resulted in its being spread to other bona fide programs. In other cases however, activation of a virus could cause malfunctioning of the computer running the program including, in extreme cases, the crashing of the computer and the loss of data.

Computer software intended to detect (and in some cases disinfect) infected programs has in general relied as a first step upon identifying those data files which contain executable code, e.g. .exe, .com, .bat. Once identified, these files are searched (or parsed) for certain signatures which are associated with known viruses. The producers of anti-virus software maintain up to date records of such signatures which may be, for example, checksums.

WO95/12162 describes a virus protection system in which executable data files about to be executed are passed from user computers of a computer network to a central server for virus checking. Checking involves parsing the files for signatures of known viruses as well as for signatures of files known to be clean (or uninfected).

In 1995, a new virus strain was identified which infected, in particular, files of the Microsoft Office™ system. Given the dominant position of Microsoft Office™ in the computer market, the discovery of these viruses has caused much consternation.

Microsoft Office™ makes considerable use of so-called "macros" which are generally small executable programs written in a simple high level language. Macros may be created, for example, to provide customised menu bars or "intelligent" document templates or may be embedded in some other file format. For example, macros may be embedded in template files (.dot) or even in Microsoft Word™ files (.doc).

As the new strains of virus discovered in 1995 infect macro files, they are generally referred to as "macro viruses". It will be appreciated that the possibility for macro viruses to be spread is great given the frequency with which Microsoft Office™ files are copied between two computers either by way of floppy disk or via some other form of electronic data transfer, e.g. the Internet. Indeed, viruses such as "WM/Concept" are known to have spread widely and rapidly at a global level.

Producers of anti-virus software have approached the macro virus problem by maintaining and continuously updating records of macro viruses known to exist in the "wild". As with more conventional viruses, a signature (commonly a checksum) is determined for each macro virus and these signatures are disseminated to end users of anti-virus software. The software generally scans data being written to or read from a computer's hard disk drive for the presence of macros having a checksum corresponding to one of the identified viruses.

There are a number of problems with these more or less conventional approaches. Firstly, the number of macro viruses is exploding with around 3000 identified by mid 1998. There is inevitably a time lag between a virus being released and its being identified, by which time many computers may have been infected. Secondly, end users may be slow in updating their systems with the latest virus signatures. Again, this leaves a window of opportunity for systems to be infected.

WO 98/14872 describes an anti-virus system which uses a database of known virus signatures as described above, but which additionally seeks to detect unknown viruses based upon expected virus properties. However, given the ingenuity of virus producers, such a system is unlikely to be completely effective against unusual and exotic viruses.

SUMMARY OF THE PRESENT INVENTION

It is an object of the present invention to overcome or at least mitigate the above noted disadvantages of existing anti-virus software.

This and other objects are met by screening computer data to identify macros which do not correspond to known certified and acceptable macros.

According to a first aspect of the present invention there is provided a method of screening a software file for viral infection, the method comprising;

defining a database of signatures indicative of macros previously certified as being virus free;

scanning said file to determine whether or not the file contains a macro; and if the file contains a macro, determining whether or not the macro has a signature corresponding to one of the signatures contained in said database.

It will be appreciated that embodiments of the present invention have the advantage that they may be used to effectively block the transfer and/or processing of files which contain a previously unidentified (either to the local user or to the software producer) macro virus. It is therefore less critical (or even unnecessary) for the software to be updated to take account of newly detected viruses).

Preferably, said step of defining a database of signatures indicative of macros previously certified as being virus free comprises scanning a set of end user applications which are known to be virus free to identify macros therein, determining a signature for each of the identified macros, and compiling the determined signatures into the database. More preferably, the step of defining the database comprises the further steps of updating the database with additional macro signatures. This updating may be done via an electronic link between a computer hosting the database (where the scanning of the file is performed) and a remote central computer. Alternatively, the database may be updated by way of data stored on an electronic storage medium such as a floppy disk. The database may also include signatures corresponding to widely used proprietary macros, e.g. those used by large organisations.

Preferably, the method comprises defining a second database comprising signatures indicative of macro viruses, and scanning said file to determine whether or not the file contains a signature corresponding to one of signatures contained in the second database. This second database may be created at a central site and disseminated to end users by floppy disk or direct electronic data transfer.

Preferably, the method comprises creating a set of signatures corresponding to a set of user specific macros, certified by the user as being virus free. These signatures may be added to the first mentioned database, or may be included in a separate database. In either case, the method comprises scanning a macro identified in a file to determine whether or not the macro has a signature corresponding to a signature of a user certified macro. The user in this case may be an end user, but preferably is a network manager. In the latter case, database updates made by the network manager are communicated to the network end user computers where the virus screening is performed.

According to a second aspect of the present invention there is provided a method of screening a software file for viral infection, the method comprising:

defining a first database of known macro virus signatures, a second database of known and certified commercial macro signatures, and a third database of known and certified local macro signatures;

scanning said file to determine whether or not the file contains a macro; and, if the file contains a macro determining a signature for the macro and screening that signature against the signatures contained in said databases; and alerting a user in the event that the macro has a signature corresponding to a signature contained in said first database and/or in the event that the macro has a signature which does not correspond to a signature contained in either of the second and third databases.

According to a third aspect of the present invention there is provided apparatus for screening a software file for viral infection, the apparatus comprising;

a memory storing a set of signatures indicative of macros previously certified as being virus free; and a data processor arranged to scan said file to determine whether or not the file contains a macro and, if the file does contain a macro, to determine whether or not the macro has a signature corresponding to one of the signatures contained in said database.

According to a third aspect of the present invention there is provided a computer memory encoded with executable instructions representing a computer program for causing a computer system to:

maintain a database of signatures indicative of macros previously certified as being virus free;

scan data files to determine whether or not the files contains a macro; and if a file contains a macro, determine whether or not the macro has a signature corresponding to one of the signatures contained in said database.

Preferably, the computer program provides for the updating of said database with additional macro signatures.

Preferably, the computer program causes a second database to be maintained which comprises signatures indicative of macro viruses, and further causes the files to be scanned to determine whether or not they contain a signature corresponding to one of signatures contained in the second database. More preferably, the computer program causes a third database to be maintained which comprises signatures indicative of macros defined locally, e.g. at the level of a local network to which the programmed computer is connected. The computer program causes this third database to be scanned for a match between signatures of a file macro not already matched in the first and second databases, and signatures contained in the third database.

DETAILED DESCRIPTION OF CERTAIN EMBODIMENTS

Figure 1:
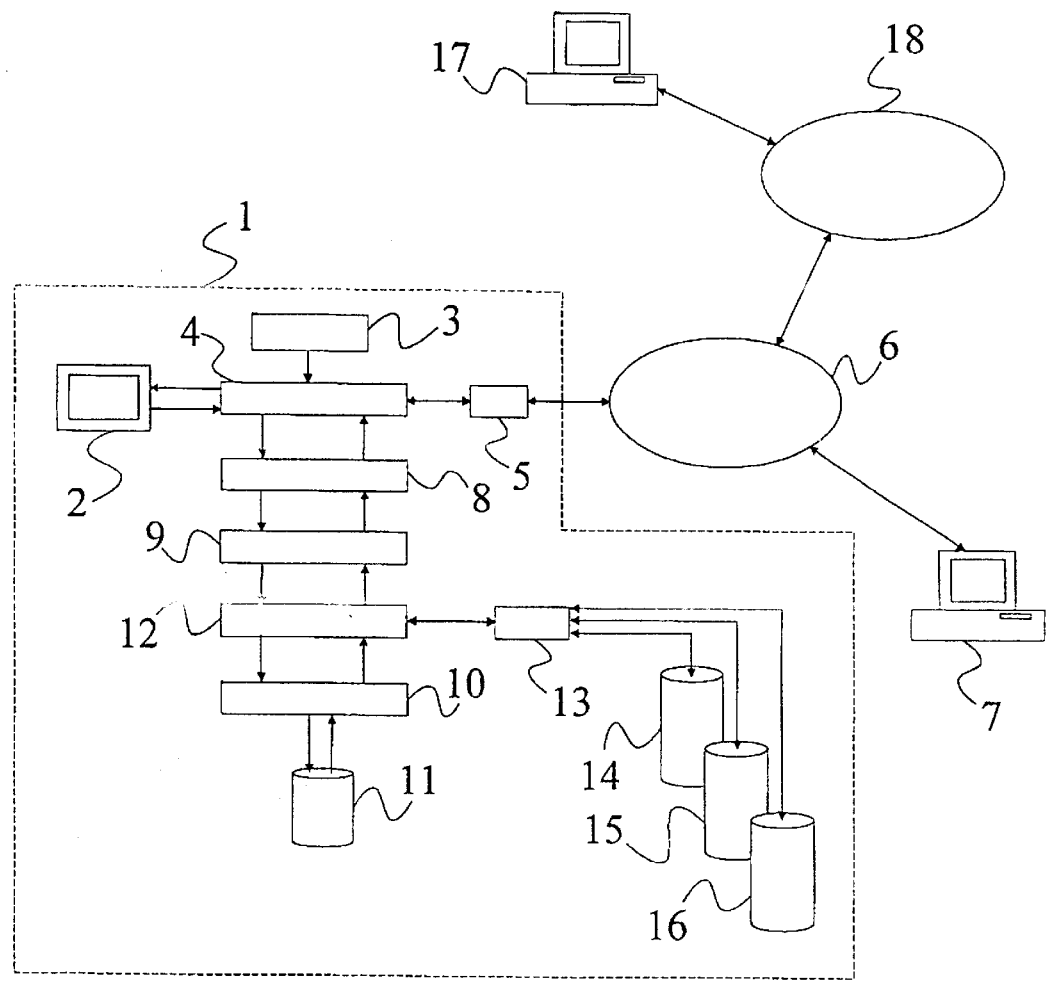
FIG. 1 is a functional block diagram of a computer system in which is installed macro virus screening software.

For the purpose of illustration, the following example is described with reference to the Microsoft Windows™ series of operating systems, although it will be appreciated that the invention is also applicable to other operating systems such as Macintosh system and OS/2. With reference to FIG. 1, an end user computer 1 has a display 2 and a keyboard 3. The computer 1 additionally has a processing unit and a memory which provide (in functional terms) a graphical user interface layer 4 which provides data to the display 2 and receives data from the keyboard 3. The graphical user interface layer 4 is able to communicate with other computers via a network interface 5 and a network 6. The network is controlled by a network manager 7.

Beneath the graphical user interface layer 4, a number of user applications are run by the processing unit. In FIG. 1, only a single application 8 is illustrated and may be, for example, Microsoft Word™. The application 8 communicates with a file system 9 which forms part of the Microsoft Windows™ operating system and which is arranged to handle file access requests generated by the application 8. These access requests include file open requests, file save requests, file copy requests, etc. The lowermost layer of the operating system is the disk controller driver 10 which communicates with and controls the computer's hard disk drive 11. The disk controller driver 10 also forms part of the Microsoft Windows™ operating system.

Located between the file system 9 and the disk controller driver 10 is a file system driver 12 which intercepts file system events generated by the file system 9. The role of the file system driver 12 is to co-ordinate virus screening operations for data being written to, or read from, the hard disk drive 11. A suitable file system driver 12 is, for example, the GATEKEEPER™ driver which forms part of the F-SECURE ANTI-VIRUS™ system available from Data Fellows Oy (Helsinki, Finland). In dependence upon certain screening operations to be described below, the file system driver 12 enables file system events to proceed normally or prevents file system events and issues appropriate alert messages to the file system 9.

The file system driver 12 is functionally connected to a macro virus controller 13, such that file system events received by the file system driver 12 are relayed to the macro virus controller 13. The macro virus controller is associated with three databases 14 to 16 which each contain a set of "signatures" previously determined for respective macros. For the purposes of this example, the signature used is a checksum derived using a suitable checksum calculation algorithm, such as the US Department of Defence Secure Hash Algorithm (SHA) or the older CRC 32 algorithm.

The first database 14 contains a set of signatures derived for known macro viruses. The signatures in this database 11 are determined by the provider of the file driver system 12 and the macro virus controller 13 and are regularly updated to take into account newly discovered viruses. Updates may be provided by way of floppy disks or directly by downloading them from a remote server 17 connected to the Internet 18.

The second database 15 contains a set of signatures derived for commercially available macros. These macros include those supplied with the Microsoft Office™ operating system and with user applications such as Microsoft Word™. Again, these signatures are determined by the provider of the file driver system 12 and the macro virus controller 13 and are regularly updated to take into account newly available products.

The third database 16 contains a set of signatures which are derived for macros created and used at the local network level, for example letter templates and the like (of course this database may be empty if no local macros are defined). Once a new local macro is created, typically at the network manager 7, the macro is processed by the network manager 7 to derive the corresponding (checksum) signature. This is then relayed via the local network 6 to the end user computer 1 where it is added to the third database 16. It is usually the case that only the network manager has the authority to modify this database 16, whilst the first and second databases 14,15 can be updated only by the network manager 7 using signatures specified by the anti-virus software provider.

Upon receipt of a file system event, the macro virus controller 13 first analyses the file associated with the event (and which is intended to be written to the hard disk drive 11, read, copied, etc) to determine if the file contains a macro. This may include examining the file name extension (e.g. to identify dot, .doc files) and/or scanning the file for embedded macros. If one or more macros is identified in the file, a checksum signature is determined for the/or each identified macro.

Assuming that a single macro is identified in the file, the macro virus controller 13 scans the first database 14 to determine whether or not the corresponding signature is present in that database 14. If the signature is found there, the macro virus controller 13 reports this to the file system driver 12. The file system driver 12 in turn causes the system event to be suspended and causes an alert to be displayed to the user that a known virus is present in the file. The file system driver 12 may also cause a report to be sent to the network manager 7 via the local network 6.

If this first scan does not locate a known virus, the macro virus controller 13 proceeds to search the second database 15 to determine whether or not the signature for the identified macro is present in that database 15. If the signature is found, then an appropriate report is sent to the file system driver 12, which in turn allows the file event to proceed normally. However, if the signature is not found in the second database 15, this indicates that the identified macro is unknown to the system and may be a new and unknown virus.

Before a warning is issued to the user, the macro virus controller 13 searches the third database 16 to determine whether the as yet unidentified macro corresponds to a locally defined macro. If the answer is yes, then the macro virus controller 13 reports accordingly to the file system driver 12 and the event is allowed to proceed. On the other hand, if the identified macro signature is not found in the third database 16, then the macro virus controller 13 reports this to the file system driver 12 and the event is suspended. Again, a report is sent to the network manager 7, and also possibly to the remote server 17 of the software provider. This report may be accompanied by a copy of the "guilty" macro.

Figure 2:
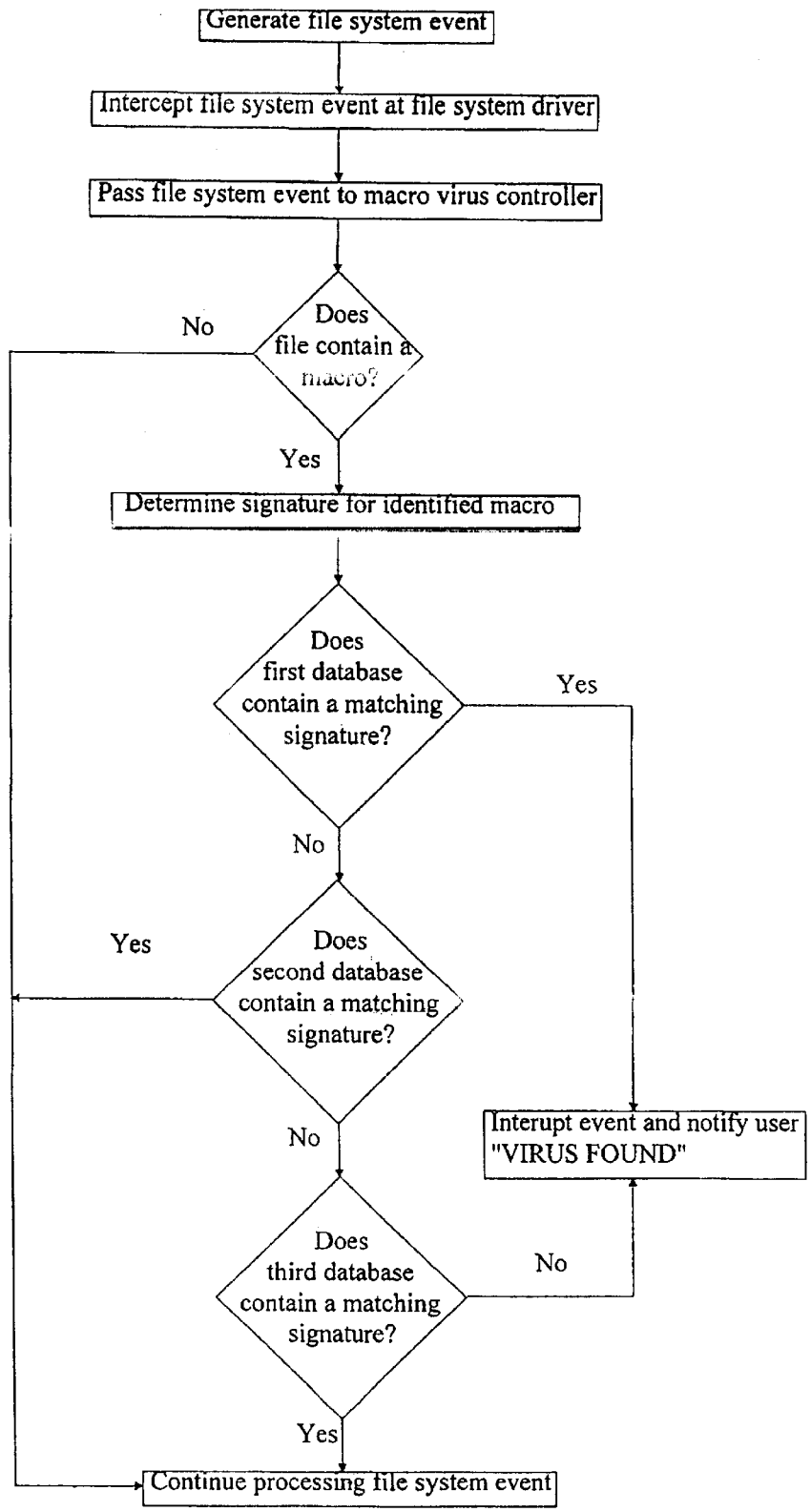
FIG. 2 is a flow chart illustrating the method of operation of the system of FIG. 1.

The file scanning system described above is further illustrated by reference to the flow chart of FIG. 2.

It will be appreciated by the person of skill in the art that various modifications may be made to the embodiment described above without departing from the scope of the present invention. For example, the file system driver 12 may make use of further virus controllers including controllers arranged to screen files for viruses other than macro viruses. The file system driver 12 may also employ disinfection systems and data encryption systems.

It will also be appreciated that the file system driver 12 typically receives all file access traffic, and not only that relating to hard disk access. All access requests may be passed to the macro virus controller 13 which may select only hard disk access requests for further processing or may also process other requests relating to, but not limited to, floppy disk data transfers, network data transfers, and CDROM data transfers.

We claim:
1. A method of screening a software file for viral infection, the method comprising:
  defining a first database of known macro virus signatures, a second database of known and certified commercial macro signatures, and a third database of known and certified local macro signatures;
  scanning said file to determine whether or not the file contains a macro; and, if the file contains a macro
  determining a signature for the macro and screening that signature against the signatures contained in said databases; and
  alerting a user in the event that the macro has a signature corresponding to a signature contained in said first database and/or in the event that the macro has a signature which does not correspond to a signature contained in either of the second and third databases.

2. A method according to claim 1, wherein said step of defining a second database of known and certifiable commercial macro signatures comprises scanning a set of end user applications which are known to be virus free to identify macros therein, determining a signature for each of the identified macros, and compiling the determined signatures into the second database.

3. A method according to claim 1, wherein the step of defining the third database comprises the further steps of updating the third database with additional macro signatures.

4. A method according to claim 3, wherein said updating steps are done via an electronic link between a computer hosting the database, where the scanning of the file is performed, and a remote central computer.

5. A method according to claim 1, wherein thee user is a network manager and database updates made by the network manager are communicated to network end user computers where virus screening is performed.

6. A method according to claim 1, wherein said step of determining a signature for the macro and screening that signature comprises deriving a signature of the macro and comparing the derived signature with signatures in the databases.

7. A method of screening a software file to determine whether any macro contained therein does or does not contain a virus, the method comprising:
  defining a first database of known macro virus signatures, a second database of known and certified commercial macro signatures, and a third database of known and certified local macro signatures;
  scanning said file to determine whether or not the file contains a macro; and if the file contains a macro, determining whether or not the macro has a signature corresponding to one of the signatures contained in said databases.

8. Apparatus for screening a software file for viral infection, the apparatus comprising:

a memory storing a first database of known macro virus signatures, a second database of known and certified commercial macro signatures, and a third database of known and certified local macro signatures; and a data processor arranged to scan said file to determine whether or not the file contains a macro and, if the file does contain a macro, to determine whether or not the macro has a signature corresponding to one of the signatures contained in said databases.

9. The apparatus according to claim 8, wherein, in order to determine whether or not the macro has a signature corresponding to one of the signatures contained in said databases, said data processor is arranged to derive a signature of the macro and to compare the derived signature with signatures in the databases.

10. A computer memory encoded with executable instructions representing a computer program for causing computer system to:

maintain a first database of known macro virus signatures, a second database of known and certified commercial macro signatures, and a third database of known and certified local macro signatures;

scan data files to determine whether or not the files contains a macro; and if a file contains a macro, determine whether or not the macro has a signature corresponding to one of the signatures contained in said second database.

11. A computer memory according to claim 10, wherein the computer program provides for the updating of said third database with additional macro signatures.

12. A computer memory according to claim 10, wherein the computer program causes the files to be scanned to determine whether or not they contain a signature corresponding to one of signatures contained in the first database.

13. A computer memory according to claim 12, wherein the computer program causes the third database to be scanned for a match between signatures of a file macro not already matched in the first and second databases, and signatures contained in the third database.

14. The computer memory according to claim 10, wherein in order to determine whether or not the macro has a signature corresponding to one of the signatures contained in said databases, said computer program causes the computer system to derive a signature of the macro and to compare the derived signature with signatures in the databases.

* * * * *

UNITED STATES PATENT AND TRADEMARK OFFICE
CERTIFICATE OF CORRECTION

PATENT NO. : 6,577,920 B1  Page 1 of 1
APPLICATION NO. : 09/165279
DATED : June 10, 2003
INVENTOR(S) : Mikko Hypponen et al.

It is certified that error appears in the above-identified patent and that said Letters Patent is hereby corrected as shown below:

Title Page, Item (75): Please add --Alexey Kirichenko, Espoo (FI)-- (As third inventor)

Signed and Sealed this

Fourth Day of August, 2009

JOHN DOLL
*Acting Director of the United States Patent and Trademark Office*